United States Patent
Daley et al.

(10) Patent No.: US 12,153,620 B2
(45) Date of Patent: *Nov. 26, 2024

(54) TYPE AHEAD SEARCH AMELIORATION BASED ON IMAGE PROCESSING

(71) Applicant: INTERNATIONAL BUSINESS MACHINES CORPORATION, Armonk, NY (US)

(72) Inventors: Stan Kevin Daley, Espanola, NM (US); Jennifer M. Hatfield, Portland, OR (US); Michael Bender, Rye Brook, NY (US); Jeremy R. Fox, Georgetown, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,098

(22) Filed: Apr. 7, 2023

(65) Prior Publication Data

US 2023/0244712 A1  Aug. 3, 2023

Related U.S. Application Data

(63) Continuation of application No. 16/953,466, filed on Nov. 20, 2020, now Pat. No. 11,681,743.

(51) Int. Cl.
*G06F 16/532* (2019.01)
*G06F 16/58* (2019.01)
(Continued)

(52) U.S. Cl.
CPC .......... *G06F 16/532* (2019.01); *G06F 16/583* (2019.01); *G06F 16/5866* (2019.01); *G06F 40/274* (2020.01)

(58) Field of Classification Search
CPC .. G06F 16/532; G06F 16/583; G06F 16/5866; G06F 40/274
See application file for complete search history.

(56) References Cited

U.S. PATENT DOCUMENTS 8,296,678 B2   10/2012   Boss et al.
8,965,909 B2   2/2015   Herron
(Continued)

FOREIGN PATENT DOCUMENTS

CA     2961952 C       4/2016
KR     20190047656     5/2019

OTHER PUBLICATIONS

U.S. Appl. No. 16/953,466, filed Nov. 20, 2020.
(Continued)

*Primary Examiner* — Richard L Bowen
*Assistant Examiner* — Aryan D Toughiry
(74) *Attorney, Agent, or Firm* — Daniel Yeates; Andrew D. Wright; Calderon Safran & Wright P.C.

(57) ABSTRACT

System and methods for type ahead search amelioration based on image processing are provided. In embodiments, a method includes: capturing, by a computing device, image data based on images viewed by a user during a computing session; converting, by the computing device, the image data to text using image processing; and storing, by the computing device, the text in a temporary buffer of a type ahead search function, wherein the text constitutes image context data for use by the type ahead search function.

20 Claims, 9 Drawing Sheets

(51) Int. Cl.
*G06F 16/583* (2019.01)
*G06F 40/274* (2020.01)

(56) References Cited

U.S. PATENT DOCUMENTS

| | | | |
|---|---|---|---|
| 2008/0227440 | A1 | 9/2008 | Settepalli |
| 2009/0164209 | A1 | 6/2009 | Erickson et al. |
| 2013/0212212 | A1 | 8/2013 | Addepalli et al. |
| 2014/0282244 | A1 | 9/2014 | Speer et al. |
| 2015/0347383 | A1 | 12/2015 | Willmore et al. |
| 2017/0011279 | A1 | 1/2017 | Soldevila et al. |
| 2017/0359415 | A1 | 12/2017 | Venkatraman et al. |
| 2018/0213175 | A1 | 7/2018 | Hlavac et al. |
| 2018/0217976 | A1 | 8/2018 | Hwang et al. |
| 2019/0188251 | A1 | 6/2019 | Liu et al. |
| 2019/0303298 | A1 | 10/2019 | Mannby |

OTHER PUBLICATIONS

Mell et al., "The NIST Definition of Cloud Computing", NIST, Special Publication 800-145, Sep. 2011, 7 pages.

Ajanki et al., "An augmented reality interface to contextual information", https://link.springer.com/article/10.1007/s10055-010-0183-5, Dec. 16, 2010, 13 pages.

Anonymous, "Augmented Reality and Virtual Reality Market Size I Global Growth 2020 Demand Status, Latest Trends, Industry Share by Regions, Key Insights and Forecast 2025", https://www.marketwatch.com/press-release/augmented-reality-and-virtu, Sep. 8, 2020, 5 pages.

Anonymous, "Object detection", Wikipedia, https://en.wikipedia.org/wiki/Object_detection, accessed Oct. 2, 2020, 2 pages.

Anonymous, "Optical character recognition", Wikipedia, https://en.wikipedia.org/wiki/Optical_character_recognition, accessed Oct. 2, 2020, 4 pages.

Anonymous, "Typeahead", Wikipedia, https://en.wikipedia.org/wiki/Typeahead, accessed Oct. 7, 2020, 1 page.

Anonymous, "Autocomplete definitions", https://www.yourdictionary.com/autocomplete, accessed Oct. 7, 2020, 1 page.

Anonymous, "Keyboard-buffer definitions", https://www.yourdictionary.com/keyboard-buffer accessed Oct. 7, 2020, 1 page.

Simonite, "A Google Glass App Knows What You're Looking AI", https://www.technologyreview.com/2013/09/30/176280/a-google-glass-app-knows-what-youre-looking at/, Sep. 30, 2013, 2 pages.

List of IBM Patents or Patent Applications Treated as Related, dated Apr. 5, 2023, 1 page.

TYPE AHEAD SEARCH AMELIORATION BASED ON IMAGE PROCESSING

BACKGROUND

Aspects of the present invention relate generally to type ahead searching and, more particularly, to type ahead search amelioration based on image processing.

Type ahead search (also referred to as autocomplete, word completion, incremental search, search-as-you-type, inline search, instant search, word wheeling, read ahead, and predictive text, for example) is a software feature in which an application or operating system (O/S) predicts the rest of a word or phrase a user is typing/entering into a field. Various algorithms may be utilized by an application to determine possible matches for text being entered by a user, and pre-fill a text field with one or more possible matches (e.g., suggested words or phrases). In some configurations, a user presses a key (e.g., a tab key) to accept a suggestion (e.g., a suggested word or phrase) on a graphical user interface, or utilizes arrow keys to scroll through one of several selectable suggestions. In other configurations, suggestions are presented to a user on a touchscreen as user-selectable tabs or keys. Type ahead search configurations provide immediate feedback to users as they enter text, which allows the user to stop short of typing the entire word or phrase they intended to enter into a text field.

Not to be confused with type ahead search functions, a keyboard buffer or type ahead buffer is a memory bank or reserved memory area that stores keystrokes until a program can accept them, allowing fast typists to continue typing while the program catches up.

SUMMARY

In a first aspect of the invention, there is a computer-implemented method including: capturing, by a computing device, image data based on images viewed by a user during a computing session; converting, by the computing device, the image data to text using image processing; and storing, by the computing device, the text in a temporary buffer of a type ahead search function, wherein the text constitutes image context data used by the type ahead search function.

In another aspect of the invention, there is a computer-implemented method including: receiving periodically or continuously, by a computer server, image context data from a plurality of remote computing devices during an activity period, wherein the image context data comprises text determined from images processed by the respective remote computing devices during the activity period; storing, by the computer server, the image context data in a temporary group type ahead search buffer, wherein the temporary group type ahead search buffer is accessed by the plurality of remote computing devices; and removing, by the computer server, the temporary group type ahead search buffer at an end of the activity period.

In another aspect of the invention, there is a computer program product including one or more computer readable storage media having program instructions collectively stored on the one or more computer readable storage media. The program instructions are executable to: determine text associated with objects of images captured by a computing device during an activity period using image processing of the images, wherein the text constitutes image context data used by a temporary buffer of a type ahead search function; and transfer, continuously or periodically, the text to a remote computing device for storage in the temporary buffer of the type ahead search function during the activity period.

In another aspect of the invention, there is system including: a user device having a type ahead search module configured to implement type ahead search functions and a temporary buffer of the type ahead search module; an image capture device in communication with the user device, the image capture device comprising a processor, a computer readable memory, one or more computer readable storage media, and program instructions collectively stored on the one or more computer readable storage media. The program instructions executable to: determine text associated with objects of images captured by the image capture device during an activity period using images processing of the images, wherein the text constitutes image context data used by the type ahead search module of the user device; and transfer, continuously or periodically, the text to the temporary buffer of the type ahead search module during the activity period.

In another aspect of the invention, there is system including a server in communication, via a network, with a plurality of remote user devices of registered users. The server includes a processor, a computer readable memory, one or more computer readable storage media, and program instructions collectively stored on the one or more computer readable storage media. The program instructions are executable to: receive, periodically or continuously, image context data from the registered users during an activity period, wherein the image context data comprises text determined from objects within images processed during the activity period; store the image context data in a temporary group buffer; and provide the image context data from the temporary group buffer to a buffer of a type ahead search module of each of the plurality of remote user devices of the registered users for use by the respective type ahead search modules in the implementation of type ahead search functions.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
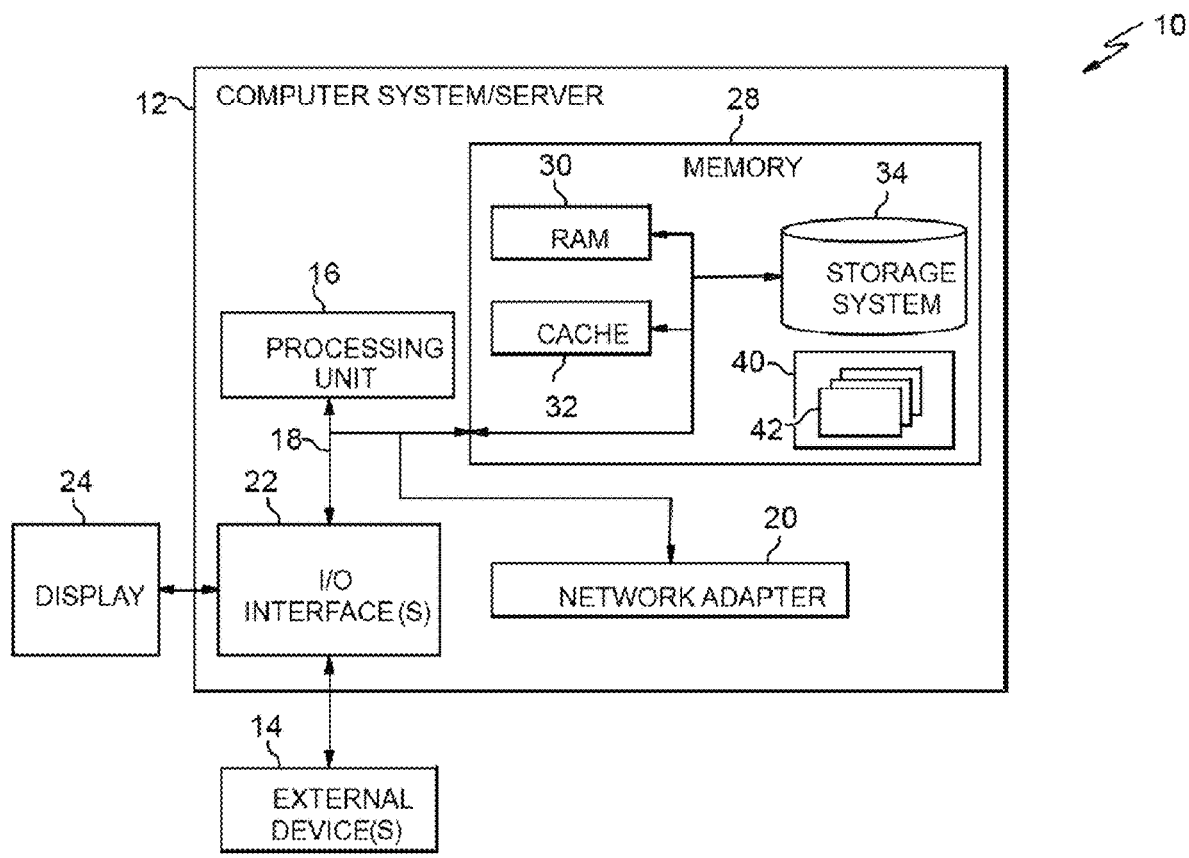
FIG. 1 depicts a cloud computing node according to an embodiment of the present invention.

Aspects of the present invention relate generally to type ahead searching and, more particularly, to type ahead search amelioration based on image processing. In embodiments, a temporary knowledge buffer establishes a baseline of text viewed by a user during an activity period, and/or text associated with images or objects viewed by the user during the activity period. In implementations, the user is provided with type ahead search features based on text stored in the temporary knowledge buffer (e.g., contextual information regarding recently viewed text and/or images). In embodiments, a user interface provides a user with highly relevant and predictive options during search functions (e.g., type ahead search functions) based on the text stored in the temporary knowledge buffer.

Type ahead search (also referred to as autocomplete, word completion, incremental search, search-as-you-type, inline search, instant search, word wheeling, read ahead, and predictive text, for example) provides immediate feedback to users as they enter text in a text field, by predicting what word or phrase the user intends to enter into the text field next based on what has already been entered into the text field, and presenting one or more suggested words or phrases. The suggested words or phrases may be selected by the user, thereby enabling a user to enter suggested text automatically in the text field without having to type or otherwise enter each letter or word into the text field.

A user may wish to utilize text-based search functions to search for information on a computer based on recently seen items; these items can be from their computer screen or from other physical objects viewed by the user. Today, such users must type words associated with the item they are looking to search into a search field, or cut and paste text regarding the item into the search field if the text is available from another part of their computer screen(s). This may be time consuming and non-productive.

Type ahead search applications may utilize various methods of predicting text to be entered next by a user in a text field. Advantageously, embodiments of the invention determine text associated with one or more objects viewed by a user in real-time or near-real time, and make the text available to type ahead search functions of a user device. Implementations of the invention provide a technical solution to the technical problem of accurately predicting text during a type ahead search function, by providing real-time image-based contextual information to type ahead search applications for use by the applications in: 1) accurately predicting the next letter(s), word or phrases the user intends to enter into the text field; and/or 2) rating or ordering the next letter(s), word or phrases for selection by the user during a type ahead search event. In embodiments, image-based contextual information associated with a particular activity and/or activity period is stored in a temporary buffer for access by an application or operating system (O/S) for determining conflicting words to an audio system (e.g., virtual assistant or smart speakers) when the system is having problems determining the words being spoken.

Advantageously, embodiments of the invention generate a personalized buffer for a user within a time period and/or based on a particular task or activity, which provides type ahead search or autocomplete functionality based on the user's unique past temporal events to generate future text predictions relating to task-centric activities.

In embodiments, a method is provided of improving the functionality of filling in a text field on a computer during a type ahead search event based on items recently viewed by a user. In implementations, images are captured via an image capture device (e.g., smart glasses) of a user, and text within the images is detected and stored in a buffer that can be used to improve the type ahead capabilities of an application on a user device (e.g., smartphone, laptop computer, etc.) of the user. In embodiments, an image capture device (e.g., smart glasses) utilizes image processing technology that enables a user to initiate interactive activities between the image device and a search engine by staring at an object, whereby the image capture device can compare images viewed by the user and saved images by shape, to fine tune the words or phrases to be stored in the buffer for access by a type ahead application.

In embodiments, a computer-implemented method of utilizing captured images to supplement a type ahead search buffer includes: registering and training the devices used with image capture; identifying text data from an image analysis using a computing device; determining text to supplement in the type-ahead buffer from image and shape cognitive analysis using a computing device; transferring information from an initial computing device to a second computing device that will utilize the generated text in the type ahead search buffer; and displaying the text in the type ahead search buffer based on newly captured data and prioritization rules.

In implementations, the method further includes registering the image capture devices by: communicating protocols and security controls to the device; identifying and training for trigger events; and identifying local and web-based search engines and repositories. In embodiments, the method includes: capturing an image using an image capture device; utilizing trained triggers to initiate the image capture; determining the text inside a captured image using optical character recognition (OCR) technology; filtering out defined keywords; and storing the determined text in a controlled repository. The method may also include: capturing images of objects based on gaze and defined triggers; determining a list of potential words to supplement the buffer using cognitive analysis and comparison of image shapes or other identifying markers; and selecting the generated list of drilling up or down by changing the focus of the image analysis lens and generating a new or supplemental list. In embodiments, the method may include: using natural language processing (NLP), voice recognition, gaze, blinking, specific movements or other trained actions to initiate a defined trigger; loading the data from the system repository to the defined repository on the second computing device; prioritizing selection of a word based on the word being loaded into the buffer and/or standard prioritization weights based on a configured weight; and/or utilizing the buffer at the operating system or application level when determining words to load in a type ahead search buffer (or a voice response system in an alternative embodiment).

It should be understood that, to the extent implementations of the invention collect, store, or employ personal information provided by, or obtained from, individuals (for example, registration information of users registering with a service provider), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
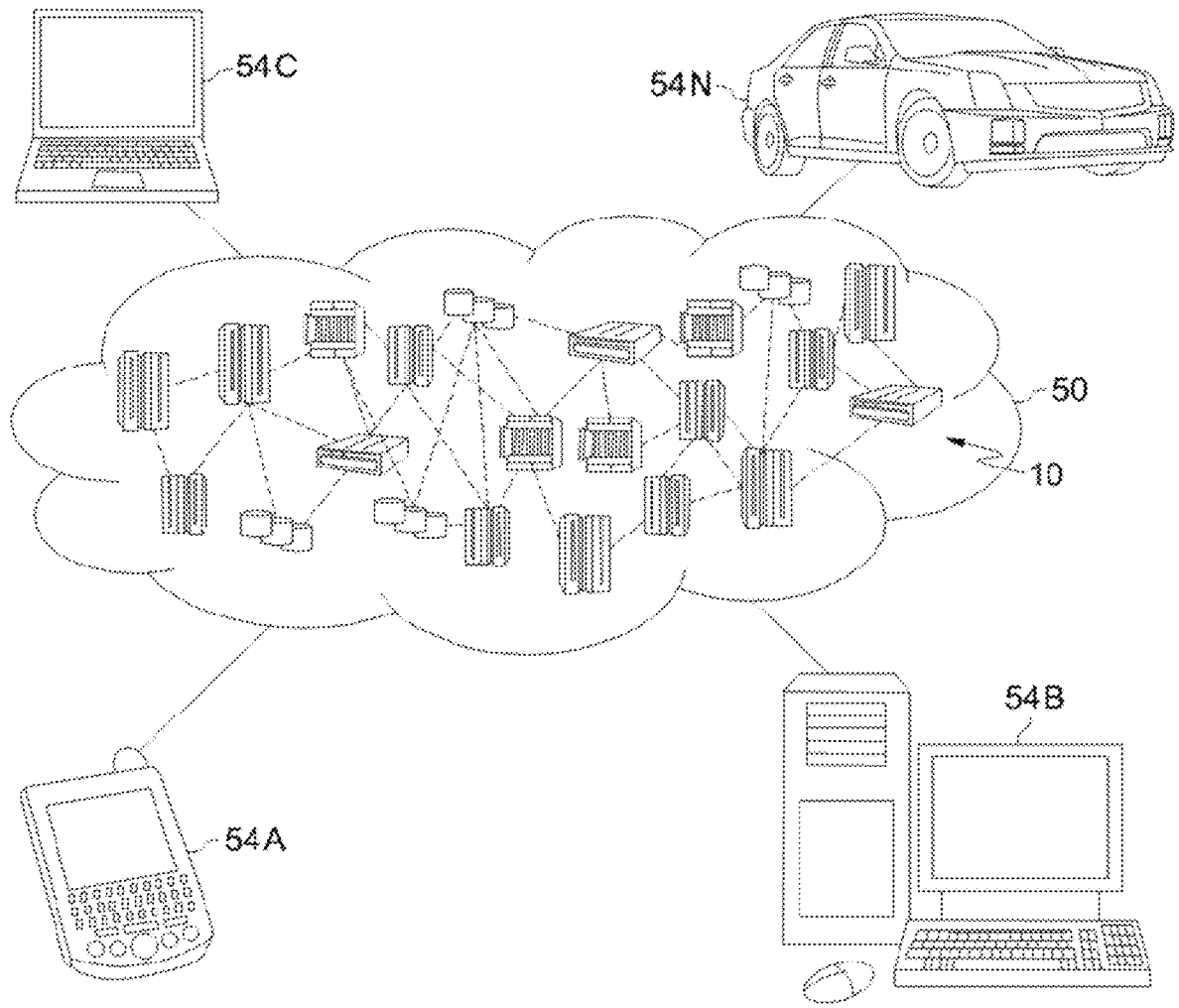
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
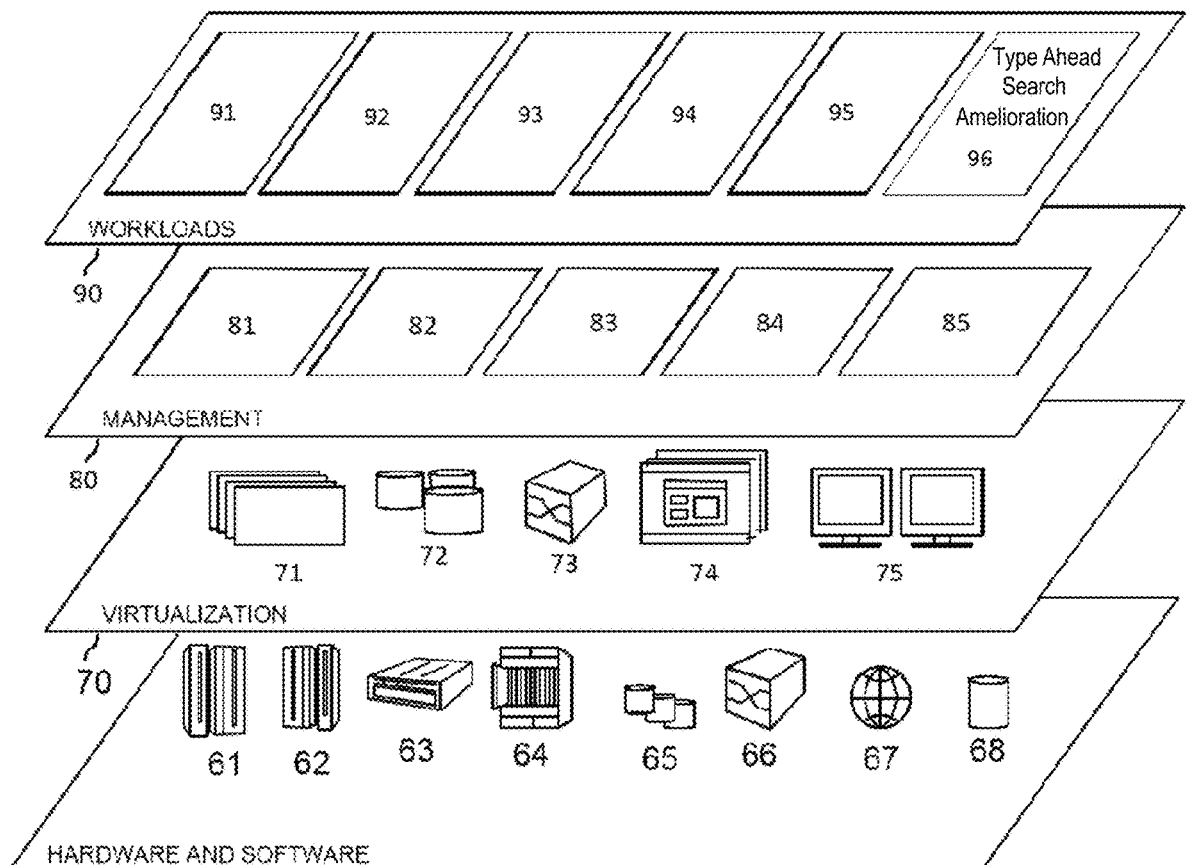
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and type ahead search amelioration 96.

Implementations of the invention may include a computer system/server 12 of FIG. 1 in which one or more of the program modules 42 are configured to perform (or cause the computer system/server 12 to perform) one of more functions of the type ahead search amelioration 96 of FIG. 3. For example, the one or more of the program modules 42 may be configured to: determine an activity period of a user or users has started, record or capture images, process the images to determine text associated with objects in the images, store the text in a temporary buffer, perform type ahead search functions based on the text in the temporary buffer, and remove the temporary buffer at an end of the activity period.

Figure 4:
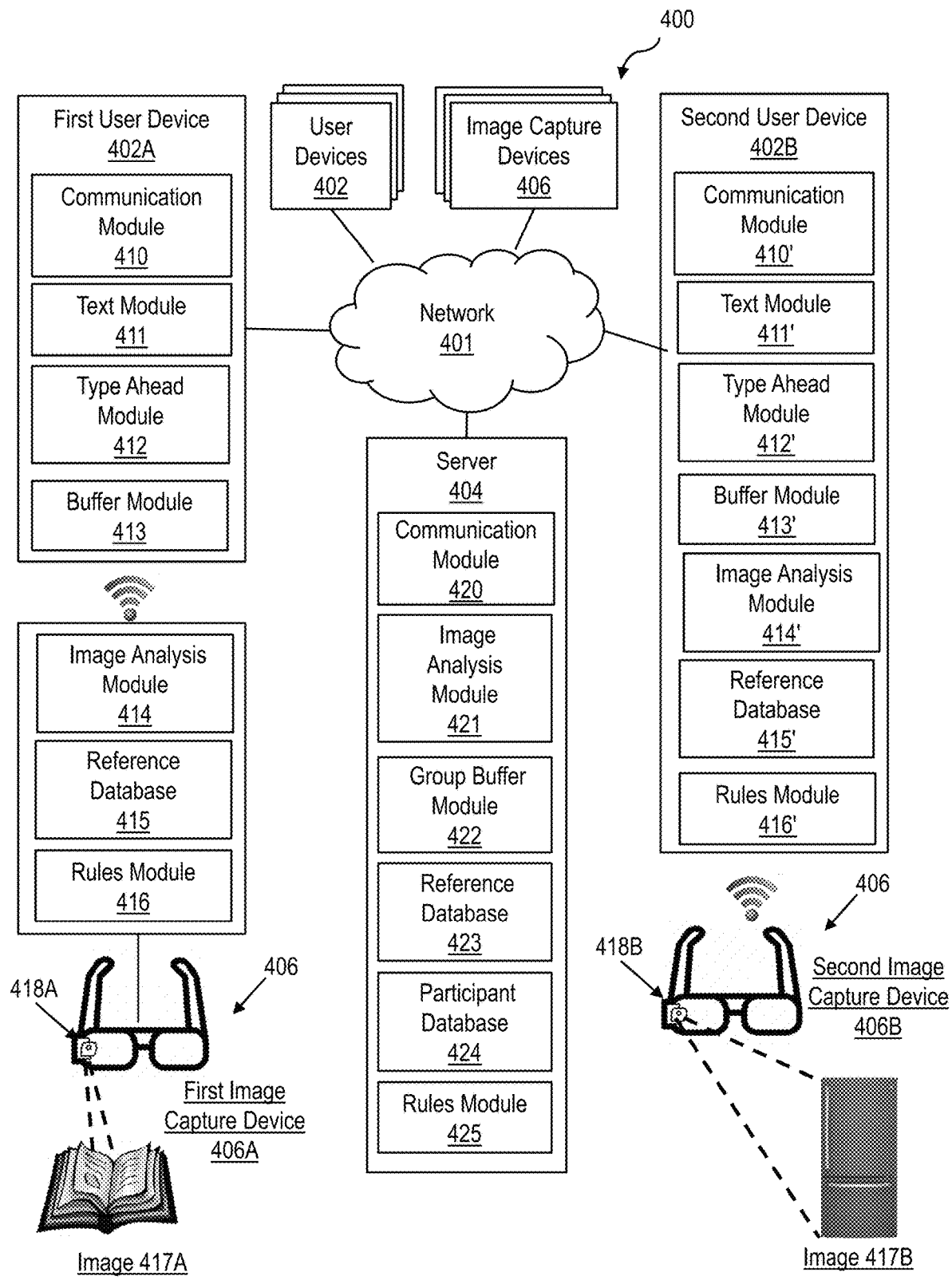
FIG. 4 shows a block diagram of an exemplary environment in accordance with aspects of the invention.

FIG. 4 shows a block diagram of an exemplary environment in accordance with aspects of the invention. In embodiments, an environment 400 includes a network 401 interconnecting user devices 402 (e.g., a first user device 402A and a second user device 402B) with a server 404, and image capture devices 406 (e.g., a first image capture device 406A and a second image capture device 406B) in communication (e.g., via a Bluetooth® connection) with the respective user devices.

FIG. 4 illustrates four exemplary configurations of the present invention. In a first configuration, the first image capture device 406A processes images captured by the first image capture device 406A and generates content for a knowledge buffer that can be accessed by software applications (e.g., text module 411) of the first user device 402A. In the second configuration, the second image capture device 406B provides image capture data to the second user device 402B, and the second user device 402B performs the processing of the captured images and maintains a knowledge buffer that can be accessed by software applications (e.g., text module 411') of the second user device 402B. In a third configuration, image capture devices 406 send content for a knowledge buffer to the server 404, and the server 404 maintains a group knowledge buffer that can be obtained/accessed by software applications (e.g., text modules 411 and 411') of respective user devices 402. In a fourth configuration a user device 402 utilizes a temporary buffer of the present invention to answer user queries.

The user devices 402 of FIG. 4 may include elements of the computer system/server 12 of FIG. 1, and may be cloud computing nodes 10 within the cloud computing environment of FIG. 2. For example, the user devices 402 may comprise personal digital assistants (PDAs), smartphones or cellular telephones 54A, desktop computers 54B, laptop computers 54C, and/or automobile computer systems 54N. In implementations, the first user device 402A includes one or more of the following modules: a communication module 410, a text module 411, a type ahead module 412, and a buffer module 413, each of which may comprise one or more program modules 42 described with respect to FIG. 1. The functions of the modules of the first user device 402A will now be discussed; however, it should be understood that other user devices (not shown) within the environment 400 may include corresponding modules with corresponding functions to those of the first user device 402A.

In implementations, the communication module 410 is configured to enable the communication of data between the first image capture device 406A and the first user device 402A, and/or between the first user device 402A and the server 404. In implementations, the first user device 402A is remote from the server 404. The first image capture device 406A may communicate with the first user device 402A via a wired or wireless connection.

In embodiments, the text module 411 comprises a software application or O/S function of the first user device 402A configured to provide a text field by which a user can enter text (e.g., via a keyboard or audio input). The text module 411 may be a search application for a browser, an email application, or a virtual assistant, for example. In another example, the text module 411 is a virtual assistant configured to obtain audio or text queries from a user and provide audio and/or text outputs to the user in response to the queries.

In implementations, the type ahead module 412 is configured to provide type ahead search functions to the text module 411, whereby one or more text, word, or phrase options are presented to pre-fill the text field of a software application or O/S, wherein the options are based on predictions of what the user will enter in the text field next. The type ahead module 412 may comprise a software application for providing type ahead search functions, which may also be referred to as autocomplete, word completion, incremental search, search-as-you-type, inline search, instant search, word wheeling, read ahead, and predictive text functions, for example.

In embodiments, the buffer module 413 is configured to maintain a temporary knowledge buffer to store image context data received (continuously or periodically) from the first image capture device 406A (text associated with the content of capture images determined by the image analysis module 414). In implementations, the buffer module 413 is configured to maintain a temporary knowledge buffer during a finite activity period, and remove the buffer at the end of the activity period. The term buffer and used herein refers to an area of storage that compensates for the different speeds of data flow or timings of events by temporarily holding a block of data to be processed or written to an input/output (I/O) device. In aspects of the invention, the buffer module 413 enables type ahead search software of the first user device 402A (e.g., type ahead module 412) to access the text stored in the buffer, wherein the type ahead search software utilizes the text to improve the accuracy of the predicted text, word, or phrase options presented to pre-fill the text field of a software application or O/S (e.g., text module 411). That is, the text in the buffer provides contextual information to the type ahead search software regarding objects and text the user has recently viewed, thereby enabling the type ahead search software to better predict the next text, word or phrase to complete a user's partial text entry in a text field (e.g., by weighing, rating and/or filtering pre-fill options).

In aspects of the invention, the image capture devices 406 of FIG. 4 may include elements of the computer system/server 12 of FIG. 1, and may be cloud computing nodes 10 within the cloud computing environment of FIG. 2. The image capture devices 406 may be in the form of smart glasses or augmented reality (AR) glasses, wearable camera devices, or other image capture devices. Image capture devices 406 may be in wired or wireless communication with other computing devices, such as smartphones, laptop computers and desktop computers. The image capture devices 406 of the present invention may include functionality such as a heads-up display configured to display information to a user, voice commands, motion detecting sensors, one or more cameras, Bluetooth® communication, speakers, or other features. In implementations, the functionality of image capture device hardware may be updated with a computer program product of the present invention to provide an improved image capture device. The image capture device 406 may be a single device or a combination of devices utilized together as a system (e.g., a pair of AR glasses and a connected digital display).

In embodiments, the image capture devices 406 of the invention (e.g., 406A and 406B) include one or more modules, each of which may comprise one or more program modules such as program modules 42 described with respect to FIG. 1. In implementations the first image capture device 406A includes one or more of the following modules: an image analysis module 414, a reference database 415, and a rules module 416, each of which may comprise one or more program modules 42.

In aspects of the invention the image analysis module 414 is configured to analyze images (represented by image 417A, for example) captured by one or more cameras 418A of the first image capture device 406A in order to determine text associated with the content of the captured images (image context data). In implementations, the image analysis module 414: 1) determines text within the images; and 2) identifies objects within the images, and determines text associated with those identified objects based on stored reference data (e.g., from the reference database 415 or from a remote reference database).

In aspects of the invention, the rules module 416 is configured to store and update rules regarding the implementations of functions of the present invention, such as determining a start and end to an activity period.

In implementations, the second user device 402B includes one or more of the following modules corresponding to modules 410-412 of the first user device 402A: a communication module 410', a text module 411', a type ahead module 412', and a buffer module 413', wherein the modules of the second user device 402B have functions corresponding to respective modules 410-413 of the first user device 402A. In implementations, the second user device 402B further includes one or more of the following modules: an image analysis module 414', an reference database 415', and a rules module 416', each of which may comprise one or more program modules 42.

In aspects of the invention, the image analysis module 414' of the second user device 402B is configured to obtain, from the second image capture device 406B, images (represented by image 417B, for example) captured by one or more cameras 418B of the second image capture device 406B. In implementations, the image analysis module 414' is further configured to analyze the captured images in order to determine text associated with the content of the captured images (image context data). In implementations, the image analysis module 414': 1) determines text within the images; and 2) identifies objects within the images, and determines text associated with those identified objects based on stored image data (e.g., from the reference database 415' or from a remote reference database).

In aspects of the invention, the rules module 416' is configured to store and update rules regarding the implementations of functions of the present invention, such as determining a start and end to an activity period.

In aspects of the invention, the server 404 of FIG. 4 may include elements of the computer system/server 12 of FIG. 1, and may be a cloud computing node 10 within the cloud computing environment of FIG. 2. In implementations, the server 404 is provided by a service provider to deliver enhanced type ahead search capabilities to the user devices 402 of FIG. 4. In embodiments, the server 404 includes one or more modules, each of which may comprise one or more program modules such as program modules 42 described with respect to FIG. 1. In implementations, the server 404 includes one or more of the following modules: a communication module 420, an image analysis module 421, a group buffer module 422, a reference database 423, a participant database 424, and a rules module 425, each of which may comprise one or more program modules 42.

In implementations, the communications module 420 of the server 404 is configured to enable communication (via the network 401) between the server 404 and user devices 402 and image capture devices 406 in the environment 400. In embodiments, the participant database 424 of the server 404 is configured to receive and store registration information for one or more participants.

The server 404 may implement a first configuration wherein the server 404 analyzes images captured by image capture devices 406 of the environment 400 to determine image context data, and/or a second configuration wherein the server 404 obtains image context data from image analysis modules of participating image capture devices 406 and/or user devices 402.

In a first example, the image analysis module 421 of the server 404 obtains images (image data) captured by participating image capture devices 406 of the environment 400 (e.g., first image capture device 406A) and analyzes the captured images (via image processing) in order to determine text associated with the content of the captured images (image context data). In embodiments, the server 404 accesses a reference database 423 of reference images and associated text, to determine the image context data. In this example, the group buffer module 422 is configured to compile the image context data generated for the participating image capture devices 406, and store the image context data in a temporary group knowledge buffer.

In a second example, instead of the server 404 generating image context data, the group buffer module 422 of the server 404 is configured to obtain image context data from image analysis modules of image capture devices 406 and or user devices 402 (e.g., image analysis module 414 and image analysis module 414'), compile the image context data, and store the image context data in a temporary group knowledge buffer.

In implementations, the group buffer module 422 is configured to maintain a temporary knowledge buffer during a finite group activity period, and remove the buffer at the end of the group activity period. In aspects of the invention, the group buffer module 422 enables type ahead search software of user devices 402 within the environment 400 to obtain or access the text stored in the group knowledge buffer, wherein the type ahead search software utilizes the text to improve the accuracy of the predicted options presented to pre-fill the text field of software applications for the entire group of user devices 402.

In embodiments, the rules module 425 of the server 404 is configured to store and update rules regarding the implementation of functions of the server 404, such as determining the beginning and ending of a group activity period.

The user devices 402 (e.g., 402A, 402B), server 404 and image capture device 406 (e.g., 402A, 402B) may include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. For example, additional user devices and image capture devices may be utilized within the environment 400.

Figure 5:
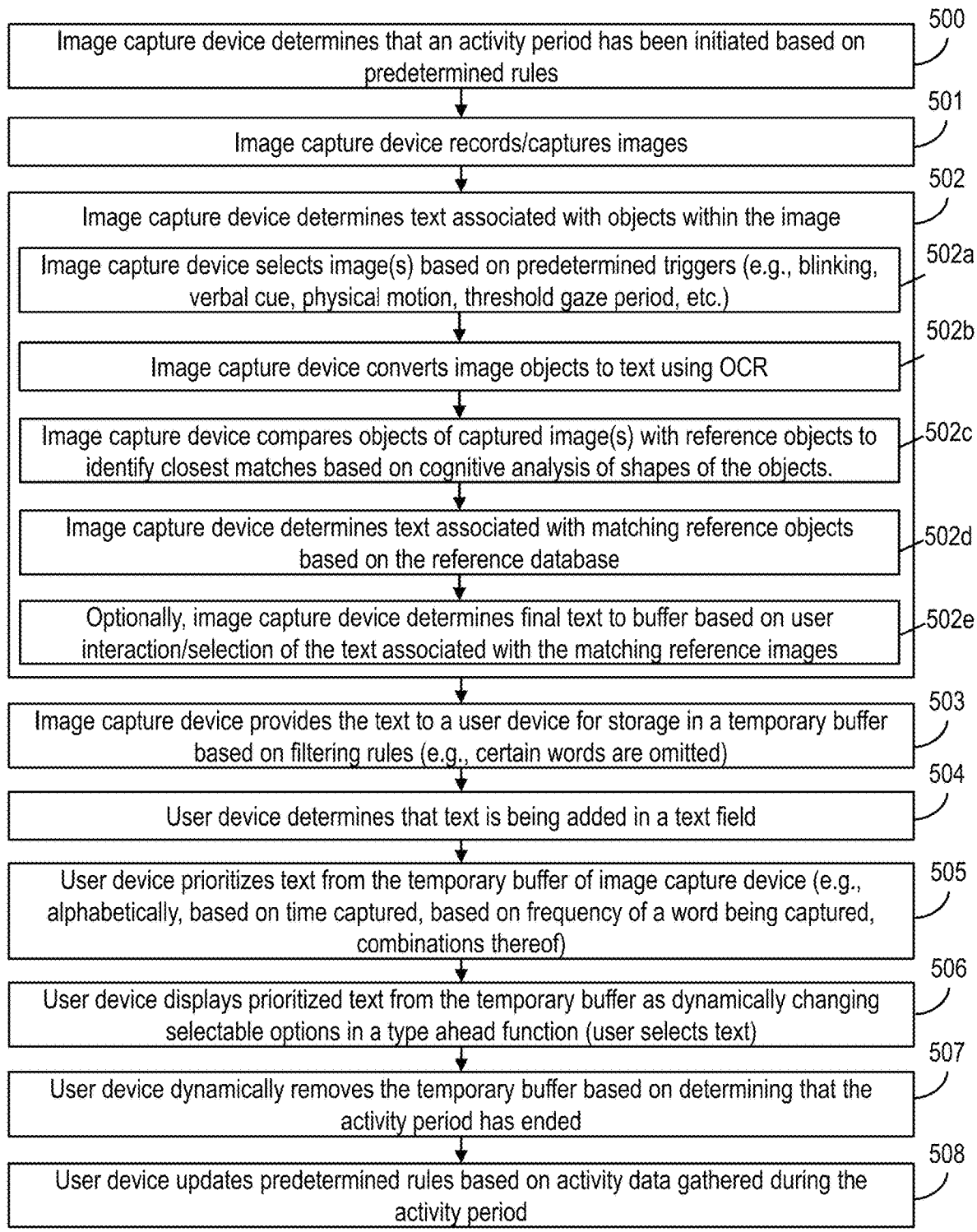
FIG. 5 shows a flowchart of an exemplary method of generating and utilizing an image capture device-generated buffer in accordance with aspects of the invention.

FIG. 5 shows a flowchart of an exemplary method of generating and utilizing a buffer in accordance with aspects of the invention. Steps of the method may be carried out in the environment of FIG. 4 and are described with reference to elements depicted in FIG. 4.

At step 500, the first image capture device 406A determines that an activity period has been initiated based on predetermined rules in the rules module 416. In embodiments, the image analysis module 414 of the first image capture device 406A implements step 500. The first image capture device 406A may communicate the start of the activity period to the first user device 402A. By way of example, the first image capture device 406A may determine that an activity period has been initiated based on predetermined rules indicating that a particular voice command from a user initiates an activity period, or based on predetermined rules indicating that pressing or touching a particular button of the first image capture device 406A initiates an activity period. In another example, predetermined rules may indicate that an activity period is initiated when the first image capture device 406A receives a command to start the activity period, such as by receiving a command from the first user device 402A. A command from the first use device 402A may be initiated by voice command, or by a user touching a button or otherwise initiating a function at the first user device 402A to start an activity period.

At step 501, the first image capture device 406A captures images (image data) via one or more cameras 418A, and stores the images for processing. In implementations, the first image capture device 406A begins to capture images for an activity period based on a determination at step 500 that the activity period has been initiated. In aspects of the invention, the first image capture device 406A captures images based on the detection of predefined triggers (e.g., a voice command of a user, or a user pushing a button). In embodiments, the first image capture device 406A captures images periodically (e.g., every 30 seconds) or continuously based on stored rules (e.g., default or user-selected rules). In embodiments, the image analysis module 414 of the first image capture device 406A implements step 501.

At step 502, the first image capture device 406A determines text (image context data) associated with objects within the images captured at step 501, including text objects, living entity objects, and/or other types of objects, via image processing techniques. In embodiments, the image analysis module 414 of the first image capture device 406A implements step 502. In implementations, substeps 502a-502e are utilized to determine the image context data of step 502.

At substep 502a, the first image capture device 406A selects one or more images based on one or more predetermined triggers stored in the rules module 416. For example, predetermined triggers in the rules module 416 may trigger the first image capture device 406A to capture and record an image when the first image capture device 406A determines that: a user has blinked in a predetermined manner, a predefined verbal cue has been received from the user, the user has performed a predetermined physical motion, the user has pressed or touched a button, and/or the user has gazed at an area and/or object for a predetermined period. It should be understood that the first image capture device 406A may use a variety of sensors (not shown) and/or one or more cameras 418A in the implementation of substep 502a. Alternatively, the first image capture device 406A may continually or periodically capture images in accordance with predetermined rules during the activity period.

At substep 502b, the first image capture device 406A utilizes optical character recognition (OCR) processing to derive image context data from images captured by the image capture device 406A. In general, OCR processing is a method of digitizing printed text by converting images of typed, handwritten or printed text into machine-encoded text. In one example, the camera 418A of the first image capture device 406A captures an image 417A of a page of a book, and the text from the image is determined by the first image capture device 406A using OCR processing.

At substep 502c, the first image capture device 406A compares objects within the captured images with reference objects in a local or remote reference database (e.g., reference database 415 or reference database 423) to identify the closest match between the objects and respective reference objects based on cognitive analysis of shapes of the objects. The reference databases (415, 415' and 423) of the present invention may contain reference data specific to a user or group of users, or may contain general reference data. In implementations, substep 502c is performed utilizing cognitive object recognition techniques, such as computer vision tasks including computer based image object detection and classification.

At substep 502d, the first image capture device 406A determines text (image context data) associated with (e.g., mapped to) the matching reference objects of substep 502c in the reference database (e.g., reference database 415). In one example, the first image capture device 406A determines that an object in a captured image is a match for a reference image of a book at step 502c, and obtains the associated descriptive text "book" from the reference database 415 for use as image context data.

At substep 502e, the first image capture device 406A optionally determines which image context data to buffer based on a user selection. In this case, the final image context data to buffer may include all determined image context data or a subset of the image context data determined at substep 502d, based on the user selection. In implementations, the first image capture device 406A presents text to the user for selection using established selection functions of the first image capture device 406A (e.g., selectable buttons, predetermined triggers such as blinking or other physical motions of the user, etc.).

In implementations, step 502 includes classification, by the first image capture device 406A, of one or more objects within the captured image, or the captured image, based on the matching of substep 502d. In aspects of the invention, the first image capture device 406A presents options to a user regarding one or more classes of an object or image. Options may be presented to and selected by users utilizing communication tools and methods (e.g., selectable user interface options, etc.). In embodiments, options are presented to a user to enable the user to further process the captured image to determine further details (e.g., subcategories) of the one or more objects. In aspects, the first image capture device 406A may look at synonyms of words (image context data) determined at step 502d. In one example, a user chooses to drill deeper into an image associated with the class "refrigerator", wherein further processing of the image by the first image capture device 406A determines that the object is associated with "brand X" and "model Y". In implementations, a user may select from synonyms or classification data (e.g., determined word-based classes or subclasses) at step 502e to determine which text (image context data) to buffer. In one example, a user may choose to select the refrigerator synonym "icebox" as image contact data to be added to the temporary buffer.

At step 503, the first image capture device 406A provides the image context data determined at step 502 to the first user device 402A for storage in a temporary buffer of the first user device 402A. In embodiments, the image context data determined at the first image capture device 406A is sent to or retrieved by the first user device 402A continuously or periodically during the activity period. In implementations, the first user device 402A accesses the image context data of the first image capture device 406A using near field communication (e.g., Bluetooth® communication).

The image context data provided by the first image capture device 406A to the first user device 402A for use in the temporary buffer may be a subset of image context data generated by the first image capture device 406A. In aspects of the invention, a filter of the first image capture device 406A filters out words according to predefined rules (e.g., English articles such as "the" and "a"), for the purpose of excluding text that would be detrimental or unhelpful in the context of type ahead search functionality. In one example, the first image capture device 406A is in the form of augmented reality (AR) glasses and the first user device 402A is in the form of a personal computing device, wherein image context data generated by the AR glasses is stored in the temporary buffer of the personal computing device by the buffer module 413 and is accessible by a type ahead module 412 supporting a search application of the personal computing device. In embodiments, the image analysis module 414 of the first image capture device 406A implements step 503.

Turning to the functions of the first user device 402A, at step 504, the first user device 402A determines that text is being added to a text field or search field of a user interface of the first user device 402A. In one example, the text module 411 of the first user device 402A is a search application providing a text field for a user to enter search terms. In this example, the text module 411 determines that a user has begun entering search terms in the text field, and initiates type ahead search functions via the type ahead module 412 of the first user device 402A.

At step 505, the first user device 402A accesses the text (image context data) in the temporary buffer, and prioritizes the text to display during type ahead search functions of a type ahead module (e.g., type ahead module 412) based on the text in the buffer. The image context data may be prioritized alphabetically, based on time the related image object(s) was/were captured, based on the frequency of a word or term appearing in the image context data, or combinations thereof, for example. It should be understood that, in implementations of the invention, image context data accessed by the first user device 402A is continuously or periodically updated during an activity period, such that type ahead search functions of the first user device 402A are influenced by recently viewed images of the user. In embodiments, the type ahead module 412 of the first user device 402A implements step 505.

At step 506, the first user device 402A displayed prioritized text from step 505 in a user interface of the first user device 402A as dynamically changing selectable options during a type ahead search function of the first user device 402A, wherein the type ahead search function is augmented with the temporary buffer of the present invention. In one example, a user is dynamically presented with letters, words, phrases or combinations thereof, as selectable options to complete a phrase the user is typing into a search field of the first user device 402A, wherein the letters, words, or phrases are based on the prioritized text from the temporary buffer of the first image capture device 406A. In accordance with type ahead search functions, the text options presented to the user dynamically change as more text is entered into a text field by the user. In aspects of the invention, a software program or browser of the first user device 402A is configured to read the prioritization from the type ahead module 412 during a type ahead search function of the first user device 402A. In embodiments, the type ahead module 412 of the first user device 402A implements step 506.

At step 507, the first user device 402A dynamically removes (e.g., deletes or clears) the temporary buffer based on a determination that the activity period has ended. In embodiments, the buffer module 413 of the first image capture device 406A implements step 507. In implementations, the duration of the temporary buffer is identified by the first user device 402A dynamically based on a determined context of an activity being performed by the user (e.g., generating an email, performing an internet search, etc.) and stored rules for that activity. In aspects of the invention, the first user device 402A determines when an identified activity associated with an activity period has ended or is completed (e.g., generating an email, performing an internet search, etc.), and removes the temporary buffer according to predetermined rules for that activity. In implementations, the first user device 402A receives an indication from a user that the activity period has ended (e.g., a voice command or press of a button indicating the activity period has ended). In embodiments the first user device 402A determines that an activity period as ended when it receives a communication from the first image capture device 406A indicating that the activity period has ended. In implementations, the image capture device 406A receives a command from the user (e.g., a voice command or the like) that the activity period has ended, and sends a communication to the first user device 402A indicating that the activity period has ended, wherein the first user device 402A removes the temporary buffer associated with the activity period.

At step 508, the first user device 402A optionally updates predetermined rules based on activity data gathered during the activity period. In embodiments, the first user device 402A records durations of different types of user activities (e.g., generating an email, performing an internet search, etc.) and utilizes this historic activity data to learn, over time, a desired time period for a temporary buffer for each of the types of activities. In certain implementations, stored rules are updated with the learned time period for the temporary buffer for each of the types of activities. In embodiments, the buffer module 413 of the first user device 402A implements step 508.

While FIG. 5 discusses the use of an image capture device with a user device, it can be understood that, in certain embodiments, the image capture device and user device are a single device, such as in the case of an augmented reality (AR) device providing a user display by which a user may enter text (e.g., via verbal commands or a virtual keyboard). In this example, the image capturing, image processing, generating a buffer, and prioritizing and displaying text based on the buffer, may all be implemented by the single device (e.g., AR device).

A first exemplary use scenario will now be discussed with respect to FIG. 5. In this example, a user of the first image capture device 406A (in the form of smart glasses) receives an email from a work colleague regarding "Matter A". Rules of the first image capture device 406A initiate an activity period when a user accesses an email via the first image capture device 406A or a first user device 402A in communication with the first image capture device 406A. Accordingly, the first image capture device 406A initiates an activity period and starts recording images, including images of the email regarding "Matter A". The user enters a search engine of the first image capture device 406A or a first user device 402A in communication with the first image capture device 406A to research Matter A, and starts entering (e.g., typing) search logic into a text field of the search engine. In this example, the user enters "M" into the search field, and a type ahead search application augmented by the temporary buffer of the present invention presents the user with four options to continue the text, including "MVP", "Matter A", "Matter", and "A", based on images recently captured by the user's first image capture device 406A. In this scenario, the user does not need to search further because he/she can simply select the option "Matter A". The type ahead search application notes the selection of the option for future reference, and the type ahead search application may increase priority of the option "Matter A" in future type ahead search sessions based on predetermined rules (e.g., rules that prioritize terms selected by the user in the past).

A second exemplary use scenario will now be discussed with respect to FIG. 5. In this example, a user is utilizing a system comprising the first image capture device 406A and the first user device 402A, which are in wireless communication with one another. Utilizing the first user device 402A, the user accesses a home retailer's website and looks at a pictures of a kitchen. The user stares at the picture for a predetermined amount of time to trigger the first image capture device 406A to capture an image of the picture according to rules of the first image capture device 406A. The first image capture device 406A compares the captured image with reference images in a reference database (e.g., reference database 415), and determines that the image is an image of a kitchen. In this example, a search function on the retailer's website enables the user to accept the word "kitchen" as a match, and look for synonyms to the term "kitchen" or drill down further into the categorization of the image. In this case, the user decides to drill down further, and continues to gaze at the picture, focusing on a refrigerator in the picture. The search function on the retailer's website asks the user if she is looking for the word "refrigerator". In this case, the user accepts the term "refrigerator", as opposed to drilling in further to a specific brand of refrigerator, for example. The term "refrigerator" is added to the temporary buffer of the first user device 402A. The user then enters a messaging application to send a text message to a friend that she has found the refrigerator that she wants to buy. As the user types an "r" in a text field, a type head search function of the first user device 402A (augmented with the temporary buffer including the term "refrigerator") automatically fills in the text field with the term "refrigerator" based on the contents of the temporary buffer.

Figure 6:
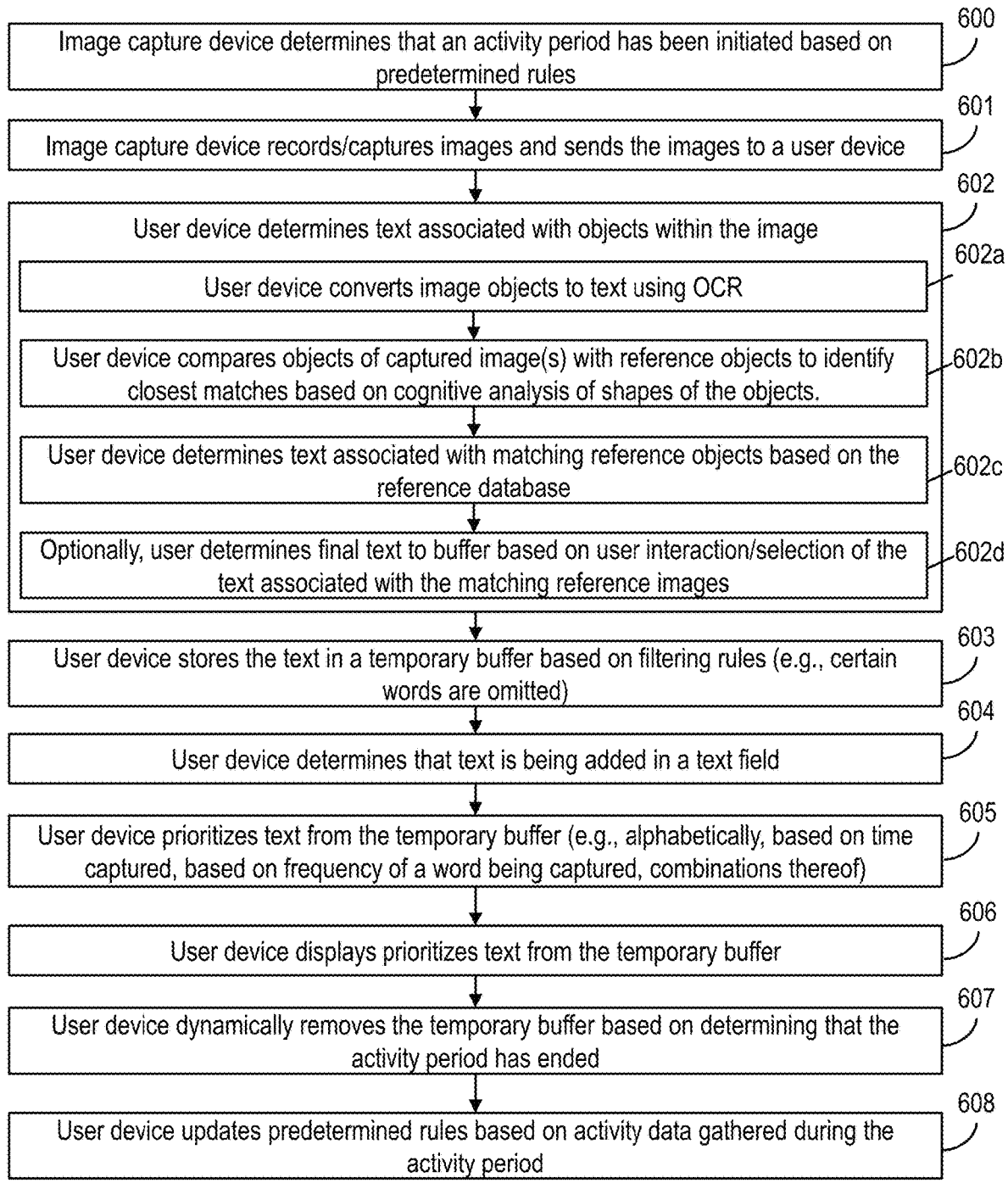
FIG. 6 shows a flowchart of an exemplary method of generating and utilizing a user device-generated buffer in accordance with aspects of the invention.

FIG. 6 shows a flowchart of an exemplary method of generating and utilizing a buffer in accordance with aspects of the invention. Steps of the method may be carried out in the environment of FIG. 4 and are described with reference to elements depicted in FIG. 4. The method of FIG. 6 provides similar functionality to the method of FIG. 5, but with image processing being performed at a user device 402 rather than an image capture device 406 of the environment 400.

At step 600, the second image capture device 406B determines that an activity period has been initiated based on predetermined rules stored therein. In embodiments, an image capturing module (not shown) of the second image capture device 406B is configured to implement step 600.

At step 601, the second image capture device 406B captures images (image data) via one or more cameras 418B, and sends the captured images to the second user device 402B for processing. In implementations, the second image capture device 406B begins to capture images for an activity period based on a determination at step 600 that the activity period has begun. The second image capture device 406B may select one or more images to capture based on one or more predetermined triggers stored in a rules database of the second image capture device 406B. For example, predetermined triggers may cause the second image capture device 406B to capture and record an image when the second image capture device 406B determines that: a user has blinked in a predetermined manner, a predefined verbal cue has been received from the user, the user has performed a predetermined physical motion, the user has pressed or touched a button, and/or the user has gazed at an area and/or object for a predetermined period. It should be understood that the second image capture device 406B may use a variety of sensors (not shown) and/or one or more cameras 418B in the implementation of step 601. Alternatively, the second image capture device 406B may continually capture images in accordance with predetermined rules during the activity period. In embodiments, the image capturing module (not shown) of the second image capture device 406B is configured to implement step 601.

At step 602, the second user device 402B determines text (image context data) associated with objects within the images captured at step 601, including text objects, living entity objects, and/or other types of objects, via image processing techniques. In embodiments, the image analysis module 414' of the second user device 402B implements step 602. In implementations, substeps 602a-602d are utilized to determine the image context data of step 602.

At substep 602a, the second user device 402B utilizes optical character recognition (OCR) processing to derive image context data from images captured by the second image capture device 406B. In one example, the camera 418B of the second image capture device 406B captures an image 417B of a refrigerator, and a brand name displayed on the refrigerator is determined by the second image capture device 406B using OCR processing.

At substep 602b, the second user device 402B compares objects within the captured images with reference objects in a local or remote reference database (e.g., reference database 415' or reference database 423) to identify the closest match between the objects and respective reference objects based on cognitive analysis of shapes of the objects. Substep 602b may be performed utilizing cognitive object recognition techniques.

At substep 602c, the second user device 402B determines text (image context data) associated with (e.g., mapped to) the matching reference objects of substep 602b in the reference database (e.g., reference database 415'). In one example, the second user device 402B determines that an object in a captured image is a match for a reference image of a refrigerator at step 602b, and obtains the associated descriptive text "refrigerator" from the reference database 415' for use as image context data.

At substep 602d, the second user device 402B optionally determines which image context data to buffer based on a user selection. In this case, the final image context data to buffer may include all determined image context data or a subset of the image context data determined at substep 602c, based on the user selection. In implementations, the second user device 402B presents text to the user for selection using established selection functions of the second user device 402B (e.g., selectable buttons or options on a user display of the second user device 402B, voice command recognition, etc.).

In implementations, step 602 includes classification, by the second user device 402B, of one or more objects within the captured image, or the captured image, based on the matching of substep 602b. In aspects of the invention, the second user device 402B presents options to a user regarding one or more classes of an object or image. Options may be presented to and selected by users utilizing communication tools and methods (e.g., selectable user interface options, etc.). In embodiments, options are presented to a user to enable the user to further process the captured image to determine further details (e.g., subcategories) of the one or more objects. In aspects, the second user device 402B may look at synonyms of words (image context data) determined at step 602c. In implementations, a user may select from synonyms or classification data (e.g., determined word-based classes or subclasses) at step 602d to determine which text (image context data) to buffer.

At step 603, the second user device 402B stores the image context data determined at step 602 in a temporary buffer of the second user device 402B. In embodiments, image context data generated by the second user device 402B is continuously or periodically stored in the temporary buffer during an activity period. In implementations, the temporary buffer is accessible by an application or O/S of the second user device 402B. In one example, the temporary buffer is accessible by a type ahead module 412' supporting a search application of the second user device 402B. In embodiments, the buffer module 413' of the second image capture device 406B implements step 603.

At step 604, the second user device 402B determines that text is being added to a text field of a user interface of the second user device 402B. In one example, the text module 411' of the second user device 402B is a search application providing a text field for a user to enter search terms. In this example, the text module 411' determines that a user has begun entering search terms in the text field, and initiates type ahead search functions via the type ahead module 412' of the second user device 402B.

At step 605, the second user device 402B accesses the text (image context data) in the temporary buffer of the second user device 402B, and prioritizes the text to use during type ahead search functions of the type ahead module 412'. The image context data may be prioritized alphabetically, based on time the related image was captured, based on the frequency of a word being captured, or combinations thereof, for example. In embodiments, the type ahead module 412' of the second user device 402B implements step 605.

At step 606, the second user device 402B displayed prioritized text from step 605 in a user interface of the second user device 402B as dynamically changing selectable options during a type ahead search function of the second user device 402B. In one example, a user is dynamically presented with letters, words, phrases or combinations thereof, as selectable options to complete a phrase the user is typing into a search field of the second user device 402B, wherein the letters, words, or phrases are based on the prioritized text from the temporary buffer. In embodiments, the type ahead module 412' of the second user device 402B implements step 606.

At step 607, the second user device 402B dynamically removes the temporary buffer based on a determination that the activity period has ended. In embodiments, the buffer module 416' of the second image capture device 406B implements step 607. In implementations, the duration of the temporary buffer is identified by the second user device 402B dynamically based on a determined context of an activity being performed by the user (e.g., generating an email, performing an internet search, etc.) and stored rules for that activity. In aspects of the invention, after an identified activity is completed (e.g., generating an email, performing an internet search, etc.), the buffering is removed by the second user device 402B according to predetermined rules for that activity.

At step 608, the second user device 402B optionally updates predetermined rules based on activity data gathered during the activity period. In embodiments, the second user device 402B records durations of different types of user activities (e.g., generating an email, performing an internet search, etc.) and utilizes this historic activity data to learn, over time, a desired time period for a temporary buffer for each of the types of activities. In certain implementations, the stored rules (e.g., in the rules modules 415' or 425) are updated with the learned time period for the temporary buffer for each of the types activities. In embodiments, the rules module 416' of the second user device 402B implements step 608.

Figure 7:
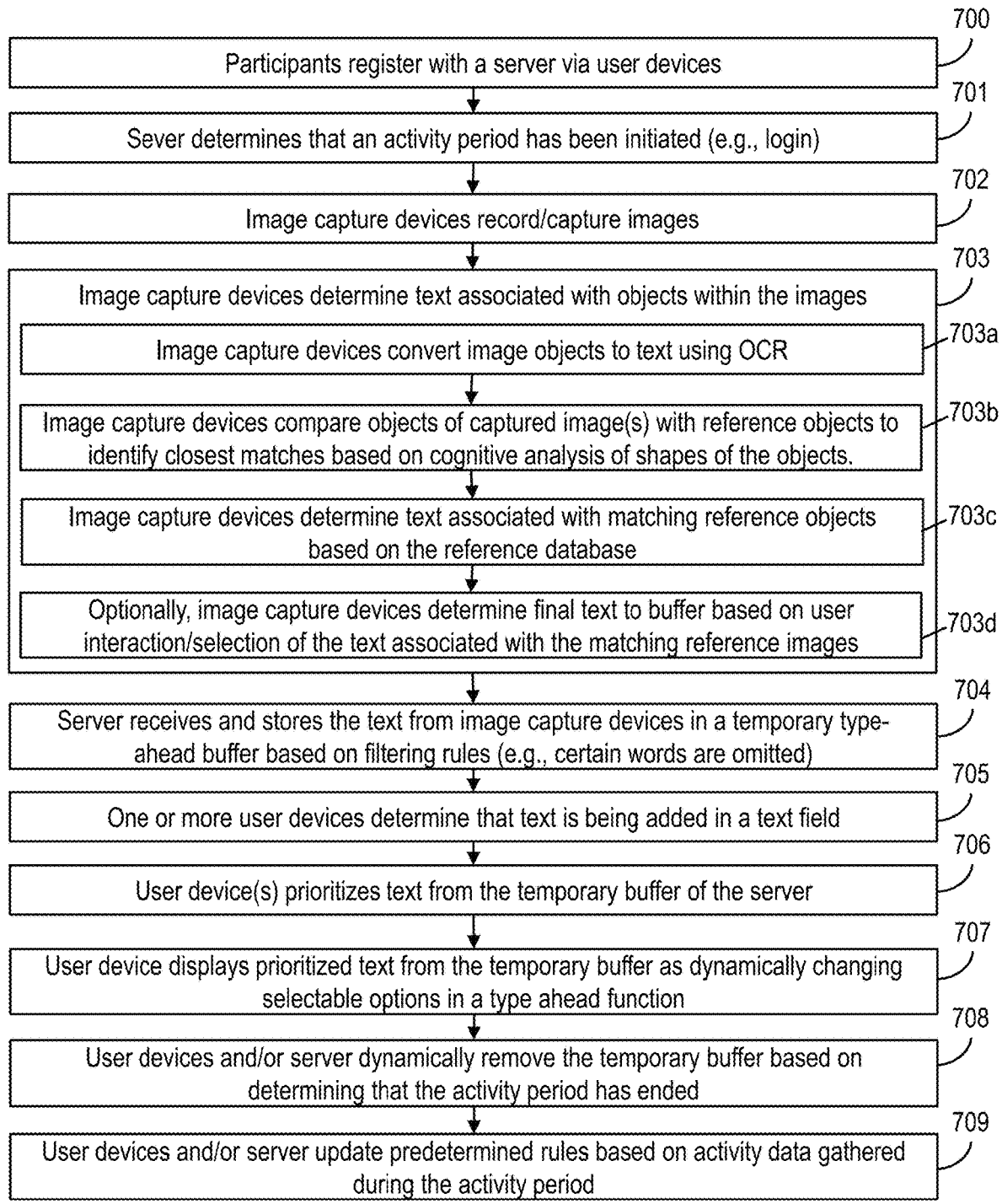
FIG. 7 shows a flowchart of an exemplary method of generating and utilizing a buffer in a group environment in accordance with aspects of the invention.

FIG. 7 shows a flowchart of an exemplary method of generating and utilizing a buffer in a group environment accordance with aspects of the invention. Steps of the method may be carried out in the environment of FIG. 4 and are described with reference to elements depicted in FIG. 4. The method of FIG. 7 provides similar functionality to the methods of FIGS. 5 and 6, but with a server 404 of the environment 400 hosting a temporary buffer accessible by multiple participants.

At step 700, participants register with the host server 404 via user interfaces of computing devices of the participants (e.g., via user interfaces of the respective first and second user devices 402A and 402B). In implementations, the communication module 420 of the server 404 provides a user interface for participant to enter registration and/or login information, and records received user registration data of participants in the participant database 424. User registration data may include identifying information of the user, user passwords and permissions, information regarding user devices and image capture devices of the user, and other information pertinent to the hosting of a group event of the present invention. In implementations, participants consent to the server 404 accessing data of their devices during registration and/or login.

At step 701, the server 404 determines that an activity period has been initiated for a group event, wherein the group event includes multiple participants. In implementations, the server 404 determines that the activity period has been initiated according to rules stored on the server 404. In one example, the rules indicate that an activity period has started when: the server 404 determined that multiple participants have logged into a group session via a user interface provided by the server 404 to user devices of the participants, and/or an administrator participant of the group session indicates to the server 404 that a group session has begun. In implementations, a participant selects or enters a time period indicating a duration of the activity period (how long the participant wants to buffer text) in a user interface in communication with the server 404.

At step 702, image capture devices 406 (e.g., image captures devices 406A and 406B) of participants each capture images (image data) via one or more cameras of the image capture devices 406 (e.g., cameras 418A, 418B), and either store the images for processing at the image capture device or send the captured images to a user device for image processing. In implementations, image capture devices 406 begin to capture images for an activity period based on a determination by the image capture devices 406 that the activity period has begun (e.g., determining that the image capture device 406 has connected with the server 404 in a participant login event). The image capture devices 406 may each select one or more images to capture based on one or more predetermined triggers stored in a rules database of the respective image capture devices 406. For example, predetermined triggers may cause the image capture devices 406 to capture and record images when the image capture devices 406 determine that: a user has blinked in a predetermined manner, a predefined verbal cue has been received from the user, the user has performed a predetermined physical motion, the user has pressed or touched a button, and/or the user has gazed at an area and/or object for a predetermined period. It should be understood that the image capture devices 406 may use a variety of sensors (not shown) and/or one or more cameras in the implementation of step 702. Alternatively, the image capture devices 406 may continually capture images in accordance with predetermined rules during the activity period. In embodiments, image analysis modules 413 of the image capture devices 406 are configured to implement step 702.

At step 703, the image capture devices 406 configured to determine image context (e.g., image capture device 406B) each determine text (image context data) associated with objects within the images captured at step 702, including text objects, living entity objects, and/or other types of objects, via image processing techniques. In embodiments, image analysis modules 413 of the image capture devices 406 implement step 703. In implementations, substeps 702*a*-702*d* are utilized to determine the image context data of step 703.

At substep 703*a*, the image capture devices 406 each utilize optical character recognition (OCR) processing to derive image context data from images captured at step 702. In one example, participants are studying during a group study event, cameras of the image capture devices 406 each capture images of pages of books during the group event, and text from the captured images is determined by the respective image capture devices 406 using OCR processing.

At substep 703*b*, the image capture devices 406 each compare objects within the captured images with reference objects in a local or remote reference database (e.g., reference database 415 or reference database 423) to identify the closest match between the objects and respective reference objects based on cognitive analysis of shapes of the objects. Substep 703*b* may be performed utilizing cognitive object recognition techniques.

At substep 703*c*, the image capture devices 406 each determine text (image context data) associated with (e.g., mapped to) the matching reference objects of substep 703*b* in the reference database (.g., reference database 415 or reference database 423). In one example, the image capture devices 406 recognize chemical structures depicted in images of book pages captured at step 702, and determine that respective chemical names are a match for the chemical structures based on data in the reference database.

At substep 703*d*, the image capture devices 406 optionally determine which image context data to buffer based on a user selection. In this case, the final image context data to buffer may include all determined image context data or a subset of the image context data determined at substep 703*c*, based on the user selection. In implementations, the image capture devices 406 present text to respective users for selection using established selection functions of the image capture devices 406 (e.g., selectable buttons, predetermined triggers such as blinking or other physical motions of the user, etc.). In implementations, the image capture devices 406 filter image context data to be sent to a temporary buffer based on predetermined rules (e.g., articles such as "the" or "a" are removed).

In implementations, step 703 includes classification, by the image capture devices 406, of one or more objects within the captured images, or the captured images themselves, based on the matching of substep 703*b*. In aspects of the invention, the image capture devices 406 present options to users regarding one or more classes of respective objects or images. Options may be presented to and selected by users utilizing communication tools and methods (e.g., selectable user interface options, etc.). In embodiments, options are presented to a user to enable the user to further process the captured image to determine further details (e.g., subcategories) of the one or more objects. In aspects, the image capture devices 406 may look at synonyms of words (image context data) determined at step 703*c*. In implementations, a user may select from synonyms or classification data (e.g., determined word-based classes or subclasses) at step 703*d* to determine which text (image context data) to buffer.

At step 704, the server 404 receives the text (image context data) determined at step 702 from the image capture devices 406 of participants, and stores the text in a temporary buffer of the server 404. In implementations, the temporary buffer is accessible or downloadable by applications of user devices 402 of the participants. In one example, the temporary buffer of the server 404 is accessible via the network 401 by type ahead modules (e.g., type ahead module 412) of the user devices 402, wherein the type ahead modules support respective search applications of the user devices. In embodiments, the group buffer module 422 of the server 404 implements step 704.

Although the example of FIG. 7 depicts image processing at the respective image capture devices 406, it should be understood that one or more of the image capture devices 406 may send image data to respective user devices 402 for image processing in accordance with the method of FIG. 6. In this alternative embodiment, the one or more user devices 402 may process the captured images according to the method of FIG. 6, and send the resulting text from the image processing (image context data) to the server 404 to be stored in a temporary buffer in accordance with step 704. In another alternative embodiments, the image capture devices 406 sends captured image data directly to the server 404 for processing by the image analysis module 421. In this embodiment, the image analysis module 421 is configured to process images in the same manner as the image analysis module 414' as depicted in FIG. 6, and text (image context data) generated by the image processing is stored in the group buffer module 422 in accordance with step 704.

Turning to the functions of the user devices 402, at step 705, one or more of the user devices 402 determine that text is being added to a text field of a user interface of the user device 402. In one example, the text module 411 of the first user device 402A is a search application providing a text field for a user to enter search terms. In this example, the text module 411 determines that a user has begun entering search terms in the text field, and initiates type ahead search functions via the type ahead module 412 of the first user device 402A.

At step 706, each of the one or more user devices 402 of step 705 loads or accesses the temporary buffer of the server 404, and prioritizes the text (image context data) in the temporary buffer for use during type ahead search functions of a type ahead module (e.g., type ahead module 412). In implementations, the one or more user devices load the temporary buffer to the respective user device before accessing data in the temporary buffer. In implementations, the communication module 420 of the server 404 provides an interface by which the one or more user devices 402 may access the temporary buffer. The text may be prioritized alphabetically, based on time the related image was captured, based on the frequency of a word being captured, or combinations thereof, for example. In one example, the type ahead module 412 of the first user device 402A implements step 706.

At step 707, each of the one or more user devices 402 displays prioritized text from step 706 in a user interface of respective user devices 402 as dynamically changing selectable options during a type ahead search function. In one example, a user is dynamically presented with letters, words, phrases or combinations thereof, as selectable options to complete a phrase the user is typing into a search field of the first user device 402A, wherein the letters, words, or phrases are based on the prioritized text from the temporary group buffer of the server 404. In this example, the type ahead module 412 of the first user device 402A implements step 707.

At step 708 the one or more user devices 402 and/or the server 404 dynamically remove the temporary group buffer based on a determination that the activity period has ended or been terminated. In implementations, the one or more user devices 402 and/or the server 404 determines that the activity period has ended based on the user selected duration of the activity period at step 700. For example, during a login event, a participant acting as an administrator for a group event may indicate that the activity period should be 1 hour long, wherein the activity period starts based on an indication from the administrator. In this example, after one hour, the server 404 removes the temporary buffer for the group event based on the user-selected duration of 1 hour. In embodiments, the buffer module 422 of the server 404 and/or the buffer module of respective users devices 402 implement step 708. In implementations, the duration of the temporary buffer is identified by the server 404 or user devices 402 dynamically based on a determined context of an activity being performed by the user (e.g., generating an email, performing an internet search, etc.) and stored rules for that activity. In aspects of the invention, after an identified activity is completed (e.g., generating an email, performing an internet search, etc.), then the buffering is removed by the server 404 and/or user devices 402 according to predetermined rules for that activity.

At step 709, the server 404 and/or user devices 402 optionally update predetermined rules based on activity data gathered during the activity period. In embodiments, the rules module 425 of the server 404 implements step 709. In aspects of the invention, the server 404 identifies different types of activities performed by groups of users and records the duration of the different types of user activities (e.g., generating an email, performing an internet search, etc.). The server 404 may then utilizes this historic activity data to learn, over time, a desired time period for a temporary buffer for each of the types of activities. In certain implementations, the stored rules (e.g., in the rules module 425) are updated by the server 404 with the learned time period for the temporary buffer for each of the types activities.

An exemplary use scenario will now be discussed regarding FIG. 7. In this scenario, a first student is working with three fellow students on a project, and they are participating in a team chat session. All four of the students are working together, and they are all viewing highly technical terms pertaining to a team-based chemistry project. The students look at different chapters within online text books, but they are all using the same resource. As the students view chapters of the text books, each image capture device 406 of the respective students build a unique collection of image context data that is specific to that student. The server 404 is configured to obtain the image context data from all of the students and share all the students' buffer type ahead search functionality, so that as the students are working together on technical chemistry terms, the server 404 enables the type ahead search function based on what all of the students have recently viewed. More specifically, the server 404 obtains image context data from respective image capture devices of the students and creates a team-based buffer that is within a cloud environment and can be accessed by user devices of the students. As one student types, they are presented with type ahead search options in the form of chemistry terms that fit the type ahead search function from the other student' input into the shared group buffer.

Figure 8:
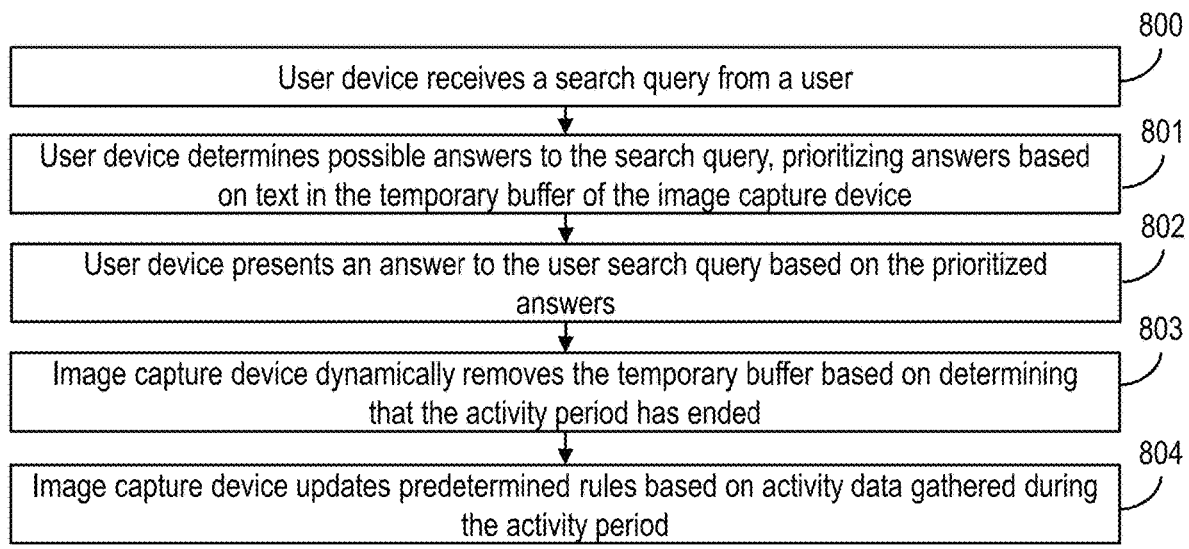
FIG. 8 is a flowchart of an exemplary method in accordance with aspects of the invention.

FIG. 8 shows a flowchart of an exemplary method of a virtual assistant utilizing a buffer in accordance with aspects of the invention. Steps of the method may be carried out in the environment of FIG. 4 and are described with reference to elements depicted in FIG. 4.

At step 800, the first user device 402A receives a query search from a user. The query search may be in the form of an audio query or a text-based query. In embodiments, the text module 411 of the first user device 402A is a virtual assistant configured to receive queries from a user and response to the user queries in accordance with standard virtual assistant functions and protocols.

At step 801, the first user device 402A determines possible answers to the query search received at step 800, wherein the possible answers are prioritized based on text in a temporary buffer generated by the first image capture device 406A in accordance with steps 500-503 of FIG. 5. It should be understood that various existing methods for determining answers to the query search may be utilized, and such existing methods are improved by the use of the temporary buffer to prioritize possible answers to the query search.

In embodiments, the first user device 402A first determines what the query search is asking based on the temporary buffer, before determining a possible answer to the query search. In this way, embodiments of the invention may utilize the temporary buffer to resolve conflicting words for a virtual assistant when the virtual assistant is having problems determining words being spoken by a user.

At step 802, the first user device 402A presents one or more of the possible answers to the user based on the prioritization of step 801. In one example, the first user device 402A presents the answer with the highest priority to the user via an audio, visual, and/or text response. In another example, the first user device 402A provides a plurality of prioritized options to the user via an audio, visual, and/or text response.

At step 803, the first image capture device 406A dynamically removes the temporary buffer based on determining that an activity period upon which the temporary buffer is based has ended. Step 803 may be performed in accordance with step 507 of FIG. 5, for example.

At step 804, the first image capture device 406A optionally updates predetermined rules based on activity data gathered during the activity period upon which the temporary buffer is based. Step 804 may be performed in accordance with step 508 of FIG. 5, for example.

Figure 9:
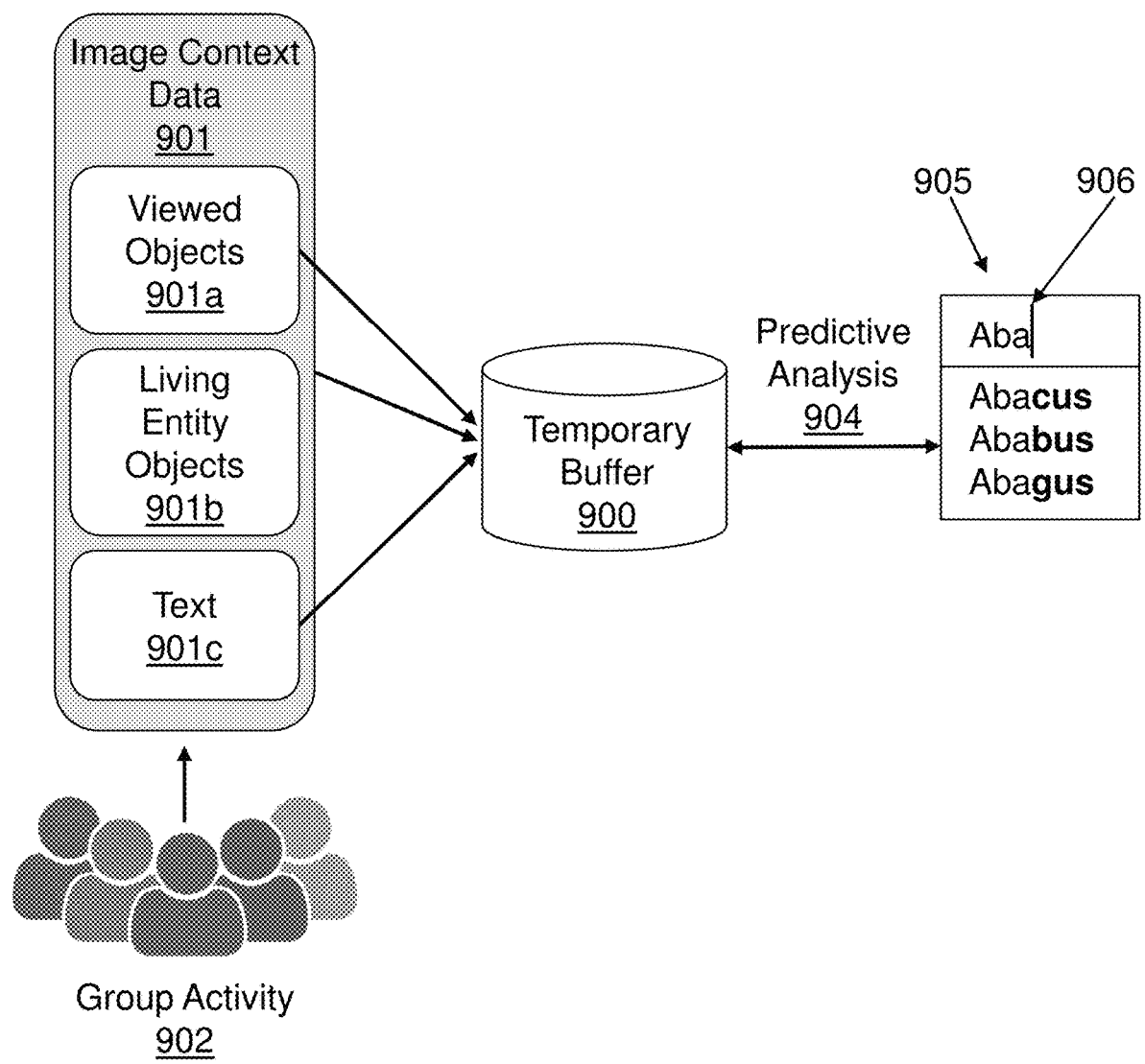
FIG. 9 is an diagram of an exemplary use scenario in accordance with aspects of the invention.

FIG. 9 is an diagram of an exemplary use scenario in accordance with aspects of the invention. The steps discussed with respect to FIG. 9 may be carried out in the environment of FIG. 4 in accordance with the method of FIG. 7, and are described with reference to elements depicted in FIG. 4.

FIG. 9 depicts a temporary buffer 900 of a server 404 is generated upon initiation of a group activity represented at 902. In this example, an administrator/participant sends a communication to the server 404 via a user device 402 indicating that the group activity has started. During the activity period, the server 404 receiving image context data 901 generated by image capture devices 406 of participants during a group activity represented at 902. In implementations, the temporary buffer 900 is generated based on image context data 901 from temporary buffers of the respective participants (e.g., temporary buffers generated by an image capture device 406 or user device 402). In aspects of the invention, the temporary buffer 900 is generated based on image context data 901 generated by an image capture device 406 or user device 402 but not stored in a temporary buffer of the user device or image capture device. Image context data 901 may be generated in accordance with the methods described above in FIGS. 5-7. In the example of FIG. 9, the image context data 901 includes: words describing (e.g., categorizing) objects viewed by the participants, including non-living entities (viewed objects 901a) identified in images, and living entities (e.g., people or animals) identified in images (living entity objects 901b); and text extracted from the images using OCR.

In the example of FIG. 9, user devices (e.g., user devices 402) of the participants perform a predictive analysis to predict the next text entry to be made by respective participants in text fields (e.g., text field 905) of the user devices, based on the image context data in the temporary buffer 900. In the exemplary text field 905 of FIG. 9, the text "Aba" has been entered by a participant into the text field 905 of a user device (wherein the cursor 906 indicates a participant is entering text into the text field 905), and the user device displays prioritized selectable text options "Abacus", "Ababus", and "Abagus" based on the image context data stored in the temporary buffer 900. In this example, a user may press a Tab button of the user device to enter the first selectable option "Abacus" or may scroll down or otherwise select the second or third selectable option "Ababus" and "Abugus", and press an Enter button to enter the selection option.

Based on the discussion above, it can be understood that computing devices in the environment 400 of FIG. 4 may be utilized in a variety of ways to provide one or more users with an improved type ahead search experience. Certain exemplary uses of the computing device of environment 400 will now be discussed.

In one exemplary use scenario, one or more augmented reality (AR) devices (e.g., image capture devices 406) are registered with a storage location account hosted by a server (e.g., server 404) that is configured to perform image analysis and interactive processing. Communications and authorizations between the AR devices and buffer storage of the server are initiated with proper credentials. Each registered AR device is trained for interactive communications with a user (e.g. stare, blink and/or audio command). Each human action (e.g., stare, blink, audio command) is then linked to a desired action to be taken by the AR device for identifying or accepting text associated with images (image context data) to be used in type ahead recommendations of an associated user device (e.g., user device 406). In this example, the server is configured to receive multiple feeds of image context data to the buffer. In embodiments, the server may be configured to only analyze text or objects within images for the purpose of improving responses of a virtual assistant to a user query.

In another exemplary use scenario, image content (e.g., image 417A) from a camera (e.g., camera 418A) of an AR device (e.g., first image capture device 406A) is captured. The image content may be all items viewed by the camera of the AR device or items in the line of site of the camera when a predetermined trigger is initiated (e.g., a voice command initiating capture of an image, a button initiating capture of the image, etc.). The AR device then uses optical character recognition (OCR) processing of the image content to convert text in the image content to text (machine-encoded text). The AR device then stores all of the text (e.g., words) in a buffer that can be accessed by or sent to an associated user device (e.g., first user device 402A). Certain words can be excluded from the buffer based on predefined rules (e.g., a, the, what).

In yet another exemplary use scenario, an image capture device analyzes images based on the image capture device recognizing a trigger from looking at an object, and capturing the image of that object. The image capture device then looks for matches to the object based on cognitive analysis of similar shaped items. The matching item (image context data) may be stored in a personalized buffer of a participant/user, or may be stored on an organizational level buffer (e.g., a corporate buffer). The image capture device compares the object to images on the internet, and when one or more matches are determined, the image capture device displays a list of the closest matches to the object. Based on this configuration, the image capture device can look for broad categories of matching objects (e.g., a kitchen) or specific matching items (e.g., a refrigerator). The image capture device allows a person to select one of the listed items and drill up or down via a predetermined trigger/interaction. The image capture device performs this function by: changing the determined focus area size of the image analysis to larger or smaller focus area size of an image; performing natural language processing (NLP) of the image context data to provide a user with guidance, and responding to prompts of a user by triggering actions of the image capture device, and storing final selections of image context data in the same buffer used to store text derived from the images.

In one exemplary use scenario, based on either a user device requesting a server buffer to be transferred to the user device, or based on a predetermined schedule, the server buffer is loaded on the registered user device via standard communications protocols. Once the server transfers the buffer, the server deletes the buffer or archives the buffer in a private system buffer.

In another exemplary use scenario, a user device is configured to supplement an existing type ahead buffer with the contents of a temporary buffer generated in accordance with methods of the present invention. Prioritization of text for use in a type ahead search function of the user device is enabled via local configuration based on a mix of standard buffering rules and rules associated with the temporary buffer. The temporary buffer is cleared out of older data based on settings of the configuration.

Based on the above, it can be understood that embodiments of the invention provide the following features. In implementations, an augmented reality (AR) device captures content consumption by capturing visual surroundings (based on any condition), and creates a knowledge buffer about a user's recent activity. In implementations, when a user is searching any topic/content or writing any content, the AR device predicts the user's activity and pre-fills the text or images, or recommends predicted text/content/keyword etc., so that the user does not have to type the entire text/content. In implementations, conditional temporal buffer prediction is tied to a specific task that the user is conducting, wherein the task is associated with start, duration, and end tracking points.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In additional embodiments, the invention provides a computer-implemented method for capturing images viewed by a user to supplement a type ahead buffer of a search field or engine, the method comprising: capturing image content (e.g., images, objects, text, etc.) viewed by a user during a computing session; converting, using image analysis and/or image classification, the image content to text; storing the text in a type ahead buffer; determining the user is viewing a search field of a browser; and inputting, automatically, the text stored in the type ahead buffer into the search field. In embodiments, capturing the image content viewed by the user is determined from an eye tracking device (e.g., AR glasses, camera, etc.). In implementations, inputting the text in the search field is based, in part, on at least one of: a time the image content was captured, organizing the text alphabetically, and/or a frequency of one or more words appearing in the text from the captured image content. In aspects, inputting the text in the search field is determined using a set of prioritization rules and/or prioritization weights. In embodiments, capturing image content and converting image content to text occurs on a first device and the inputting the text stored in the type ahead buffer into the search field occurs on a second device, wherein the second device is identified via Bluetooth.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising one or more computer readable storage media having program instructions collectively stored on the one or more computer readable storage media, the program instructions executable by a computing device to:
   capture image data based on images viewed by a user during a finite computing session;
   convert the image data to text using image processing;
   store the text in a temporary buffer of a type ahead search function, wherein the temporary buffer establishes a baseline of text associated with the images viewed by the user during the finite computing session;
   prioritize the text stored in the temporary buffer based on at least one selected from the group consisting of: alphabetization of one or more words appearing in the text stored in the temporary buffer, and a time of the image data from which the text was converted; and
   dynamically display a subset of the text stored in the temporary buffer in a search field, based on user-entered text in the search field and the prioritizing, as dynamically changing selectable options during the type ahead search function.

2. The computer program product of claim 1, wherein the program instructions are further executable to determine the user is viewing a search field of a browser.

3. The computer program product of claim 1, wherein the computing device is an image capture device in wireless communication with a remote computing device, wherein the program instructions are further executable to capture the image data using at least one camera of the image capture device.

4. The computer program product of claim 1, wherein the converting the image data comprises converting one or more text objects of the image data to machine readable text using optical character recognition (OCR) processing.

5. The computer program product of claim 4, wherein the program instructions are further executable to remove predetermined words or phrases from the machine readable text by filtering based on rules, wherein the subset of the text displayed is a subset of the machine readable text.

6. The computer program product of claim 5, wherein the program instructions are further executable to receive a selection from the user of one or more text options of the displayed subset of the text stored in the temporary buffer.

7. The computer program product of claim 4, and wherein the program instructions are further executable to:
   detect objects in the image data;
   determine that reference objects in a reference database match respective objects of the image data based on a comparison of the reference objects and the objects of the image data; and
   determine text associated with the reference objects in the reference database.

8. The computer program product of claim 1, wherein the capturing the image data is initiated by the computing device based on eye tracking functions of the computing device.

9. A computer program product comprising one or more computer readable storage media having program instructions collectively stored on the one or more computer readable storage media, the program instructions executable by a computer server to:

receive, periodically or continuously, image context data from a plurality of remote computing devices of respective participants in a group session during a finite activity period, wherein the image context data comprises text determined from images processed by the respective plurality of remote computing devices during the finite activity period;

store the image context data in a temporary group type ahead search buffer, wherein the temporary group type ahead search buffer is accessed by type ahead search software of the plurality of remote computing devices, and establishes a baseline of text associated with the images processed by each of the plurality of remote computing devices during the finite activity period; and clear the temporary group type ahead search buffer of the stored image context data at an end of the finite activity period.

10. The computer program product of claim 9, wherein the image context data includes machine readable text derived from text objects of the images processed by the respective remote computing devices, and text associated with reference objects determined to match objects of the images during the processing of the images by the respective remote computing devices.

11. The computer program product of claim 10, wherein:
the plurality of remote computing devices comprise image capture devices and personal computing devices of registered users;
the computer server receives the image context data from the image capture devices of the registered users; and
the image context data in the temporary group type ahead search buffer is accessed by the personal computing devices of the registered users.

12. The computer program product of claim 9, wherein the computer server includes software provided as a service in a cloud environment.

13. A system comprising:
a processor, a computer readable memory, one or more computer readable storage media, and program instructions collectively stored on the one or more computer readable storage media, the program instructions executable to:
determine text associated with objects of images captured during a finite activity period using image processing of the images, wherein the text constitutes image context data used by a temporary buffer of a type ahead search function; and
transfer, continuously or periodically, the text to a remote computing device for storage in the temporary buffer of the type ahead search function during the finite activity period, wherein the temporary buffer establishes a baseline of text associated with the objects of images viewed by a user during the finite activity period.

14. The system of claim 13, wherein the system further comprises an image capture device in wireless communication with the remote computing device, and the program instructions are further executable to:
capture the images using at least one camera of the image capture device; and
remove predetermined words or phrases from the text by filtering based on rules, wherein the text transferred to the remote computing device for storage in the temporary buffer is a subset of all text determined by the processing of the images.

15. The system of claim 14, wherein the capturing the images occurs in response to a triggering event determined based on predefined triggering rules and occurring during the finite activity period.

16. The system of claim 13, wherein the processing the images comprises converting one or more text objects of the images to machine readable text using optical character recognition (OCR) processing.

17. The system of claim 13, wherein the processing the images comprises:
detecting the objects in the images;
determining that reference objects in a reference database match respective ones of the objects of the images based on a comparison of the reference objects and the objects of the image; and
determining text associated with the reference objects in the reference database.

18. The system of claim 17, wherein the program instructions are further executable to present selectable text options to a user based on the text associated with the reference objects.

19. The system of claim 18, wherein the program instructions are further executable to receive a selection from the user of one or more text options, wherein the text associated with the images includes the selected one or more text options.

20. The system of claim 13, wherein the program instructions are further executable to:
obtain activity data regarding activities of a user during the finite activity period; and
update rules based on the activity data.

* * * * *